May 6, 1924.
J. THOMSON
1,492,906
METHOD AND MEANS FOR REMOLDING HARD RUBBER WATER METER DISKS TO PRECISE DIMENSIONS
Filed Feb. 24, 1923
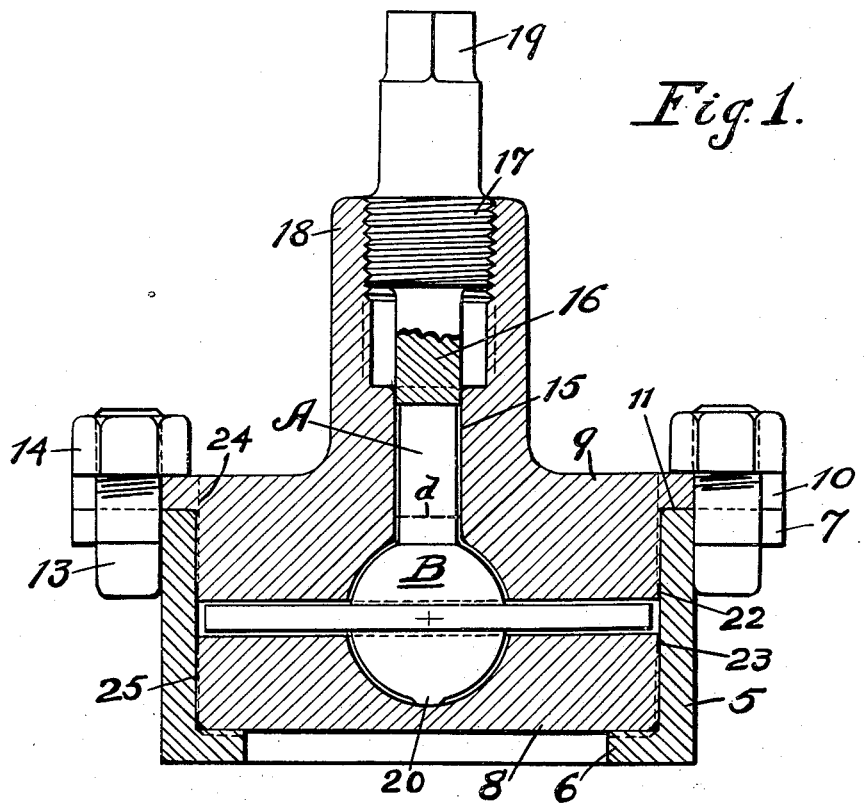
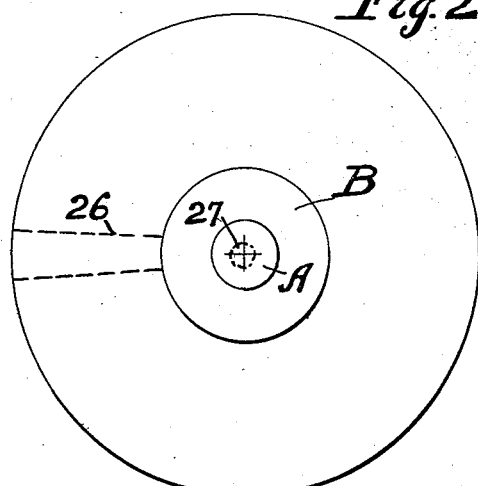
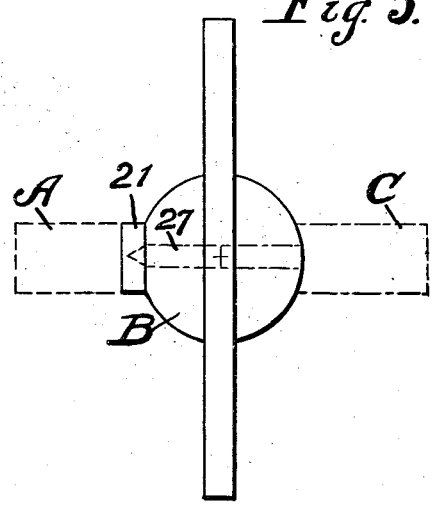
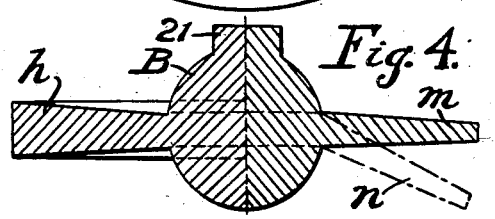
INVENTOR:
John Thomson Patented May 6, 1924.

1,492,906

UNITED STATES PATENT OFFICE.

JOHN THOMSON, OF BROOKLYN, NEW YORK.

METHOD AND MEANS FOR REMOLDING HARD RUBBER WATER-METER DISKS TO PRECISE DIMENSIONS.

Application filed February 24, 1923. Serial No. 620,862.

*To all whom it may concern:*

Be it known that I, JOHN THOMSON, a citizen of the United States, and a resident of the borough of Brooklyn, city and State of New York, have invented a Method and Means for Remolding Hard Rubber Water-Meter Disks to Precise Dimensions, of which the following is a specification.

This invention relates to water meters, consisting in method and means for remolding hard rubber disks to precise dimensions, used in the construction of water meters; and the objects thereof are to produce such articles with greater accuracy and smoothness of surface, and at a diminished cost, relative to the prevailing modes of manufacture.

In the disk type of water meter, which now dominates the market, the most difficult member to produce, that is within a close plus and minus tolerance of the exact dimensions sought, is the ball-and-disk used as a nutating piston but popularly referred to under the unitary term "disk." That the many attempts to vulcanize rubber in steel molds and thereby turn out a fully or nearly finished disk have not been satisfactory is well attested by the fact that the hundreds of thousands of them now being made annually are machined from rough-stock, usually by diamond-pointed tools, or by grinding, or both. The present applicant formerly endeavored to mold disks direct-from-the-crude, and also to remold them from pre-vulcanized disks, but such success as was attained did not meet technical and commercial requirements and further research was then abandoned.

With respect to hard rubber per se, the state of the art is so well known that a present recitation thereof would seem to be supererogatory; but it may serve to more readily visualize the ensuing subject-matter to briefly state that, when so confined as to prevent displacement, rubber is about as irresponsive to compressive deformation as water. When heated, say from about 225° to 300° F., depending upon its compounding, hard rubber becomes plastic, when it may be likened to molten sealing-wax, or bitumen, or the pasty condition of wrought iron at its welding temperature. In fact, it then simulates a fluid; which, however, is characterized by possessing an abnormally high viscosity. Again, if brought into contact with cold metal, its heat is rapidly conveyed away and it "sets" rapidly.

The method of this invention may be thus expressed: To so rough-mold a hard rubber article that its ultimate operative surfaces shall be of lesser dimensions than is required in the finished part; to provide this pre-molded article with a sprue whose volume is about equal to or exceeds that of the mass necessary to impart to the said rough-molded article and swell it to the desired dimensions of the finished part; to place the said rough molded article and its sprue in a separable molding die of precise dimensions and firmly clamped together; to heat the said die and the article therein contained to some pre-determined temperature; to apply pressure to the said sprue, causing it to flow, as a fluid, displacively into the article, thereby completely filling the die-cavity; and to then cool the die with its contained finished part, the pressure primarily imparted being meantime maintained.

Means for realizing the foregoing methods are shown in the accompanying drawings, which form a part of this specification, wherein—

Figure 1 is a transverse center section of a finishing die, or mold, in which a rough-molded under-sized disk and sprue are shown in elevation;

Figure 2 is a plan view of the finished disk;

Figure 3 is a revolved elevation thereof; and

Figure 4 is a composite transverse section showing so-called "disks" of various forms.

This finishing die is comprised in a cylinder 5 having an underlying flange 6 and upper lugs, as 7, in which is contained a lower plug 8 resting on the said flange and an upper plug 9 having lugs, as 10, resting upon the upper cylinder-face 11.

The inner faces of the said plugs are machined, with the utmost accuracy, so that when the lugs are firmly secured together, as by headed bolts and nuts 13, 14, the cavity will precisely correspond to that of the form of the desired disk.

The upper plug is bored, as 15, to receive the sprue A which rises from the ball B of the rough molded disk; and immediately above and impinging upon the sprue is a plunger 16 formed as a part of the screw 17 acting in the neck 18, which is an integral part of this plug. The screw is squared, as 19, to receive a wrench, lever or hand-wheel.

As previously stated, the rough-molded dimensions of the disk and its sprue should preferably be such that it will drop freely into place, leaving a clear space around it, permitting the plugs to be very firmly clamped together without imparting pressure to the cold and solid hard rubber. The aforesaid condition is shown in Figure 1, to a somewhat exaggerated scale, the center of the disk-ball being preferably caused to coincide with the center of the sockets, as by means of a tit 20.

According to the foregoing, the ensuing steps for realizing the method may now be taken. Thus, heat the die and its contained rough-molded disk; turn down the plunger, causing the sprue to flow into and displace the underlying mastic-like mass until the die-space is absolutely filled; finally, cool the die and its contained finished article. Then by unclamping the lug-bolts and pushing the plugs out from the cylinder, upwardly, they can be readily separated and the disk be removed without deforming it.

As the rough-molding operation cannot be performed within close dimension tolerances, that is without unduly increasing the cost thereof, it is preferable to form the sprue of such ample volume that the plunger cannot be forced down into the ball but will stop, as at the dotted line $d$, leaving a boss, as 21, Figure 3, to be removed by machining. Therefore, this boss will vary in height from one to another according to the dimensions of premolded disks.

It is of prime importance to fulfill the concept of this method that the air—all of it—contained in the free space surrounding the pre-molded disk shall be expelled; for if imprisoned, or if "pocketed" in different parts of the die, precise dimensions will not and cannot be imparted to the finished part. This feature is here readily realized by forming the perimeters of the plugs, contiguous to their inner faces, to slightly lesser diameters than that of the lower and upper centering perimeters, as denoted by the heavy lines 22, 23, and to these circular "recesses" (a diminution in their diameters of, say, .004 inch is sufficient) one or more shallow connecting vents are provided, as 24, 25, reaching to atmosphere. Thus, the incipient application of pressure upon the sprue effects the following results, namely: The upper and lower parts of the ball are bulged outwardly to the socket surfaces; as the inward flow of the sprue continues, air around the ball is rolled out to the disc-spaces; and, as these disc-spaces contiguous to the sockets become filled with rubber and flows radially outwardly, the air is continuously rolled along and finds a free and uniform vantage at the aforesaid recesses and thence to atmosphere. The ultimate pressure applied by the plunger may be, and usually is, sufficient to form circumferential fins at these recesses, but the thickness thereof is so insignificant as to be readily removable, as by the sweep of a file or scraper.

It will be manifest that, as the cross-sectional area of the plunger is many times less than that of the face-area of the plugs, the amount of pressure readily impartable to the mastic rubber is such as may be limited only by the rigidity of the lug-bolts; that all portions of the finished part are uniform in density; and that the surfaces of the completed disk are as smooth, or polished, as may be the acting surfaces of the die-plugs. Moreover, subsequent gauging may be largely dispensed with; for the die itself functions as a gauge.

The manufacturing maneuver is both simple, expeditious and inexpensive; for, given a plurality of dies, it is resolved into a circulating chain: ($a$) fill and clamp a die; ($b$) pass it to a heating chamber; ($c$) withdraw and compress; ($d$) set aside and cool; ($e$) remove the finished part, and so on interminably.

A contingent feature of singular commercial importance is that the method and means hereof may be most advantageously applied to the production of disks for the larger sizes of water meters; which, so far as this applicant is now aware, has not even been contemplated in connection with the systems of finish-molding hitherto attempted.

Various modifications can readily be made in the means here depicted and described. For example, the plunger need not revolve upon the head of the sprue but may act against an interposed washer. Pressure may be applied hydraulically or by compressed air. If one desires, the disk-slot, denoted in dotted outline 26, Figure 2, may well be molded, as is also the case if a pin-bearing, through the ball, is wanted, denoted by dotted outline 27. Again, the sprue may be applied right and left, as A and C, Figure 3, when both die-plugs would be provided with pressure-plungers, to be simultaneously operated and thereby cause two opposing streams of plastic rubber to flow inwardly, one against the other of them.

Whilst the means depicted in the drawing and correspondingly described are adapted for producing a water meter disk, which is probably the most difficult exhibit that could be selected, the general principles of construction and operation are readily applicable to various other parts used in water meters, such as turbines, gears and pinions; and also to parts for other purposes.

Where the unitary term "disk" is herein employed it is to be understood as in inclusive rather than a restrictive expression. For example, any one of the three forms shown in Figure 4, as $h$, $m$, $n$, the latter simulating a conical cup with a ball at its apex, each being different from that shown in the preceding figures, is now properly designatable in the water meter art as a "disk." In fact, the outwardly tapering section, $m$, would doubtless have been the predominating form but for the greater difficulty in machining and gauging it. If die-molded, it can be as readily produced as if its faces are parallel.

What I claim is:

1. The method of remolding a hard rubber disk to precise dimensions which consists in pre-forming it to less than the required finished dimensions and providing it with a sprue, the combined volumes thereof being approximately equal to or greater than the volume of the finished disk; inserting the said pre-formed under-sized disk and sprue in a separable molding die and clamping said die together; heating them to a temperature at which hard rubber becomes plastic and flowable; applying pressure to the sprue-end, causing the die-cavity to become completely filled, and cooling the disk in place.

2. As means for realizing the method hereof, a separable molding-die adapted to be rigidly clamped together with a solid hard rubber pre-formed disk having a sprue thereon, of less dimensions than the die-spaces; and an actuatable plunger mounted in the die and adapted to impose pressure upon the head of said sprue; whereby, when the pre-formed disk and its sprue are heated to a state of plasticity, they are caused to flow and completely fill the die-cavity.

3. In water meters, as a co-ordinating element in the means for realizing the method hereof, a roughly-formed under-size disk having an integral sprue, the volume of said sprue being approximately equal to or greater than the volume necessarily impartable to the disk, whereby its dimensions can be increased to that of the die-cavity.

4. In water meters and according to the method and means hereof, a disk die-molded when plastic to precise dimensions from a pre-formed hard rubber disk of less dimensions than the finished disk.

This specification signed on this the 22d day of February, A. D. 1923.

JOHN THOMSON.